US006521361B2

(12) United States Patent
Ejiri et al.

(10) Patent No.: US 6,521,361 B2
(45) Date of Patent: Feb. 18, 2003

(54) MAGNETIC RECORDING MEDIUM HAVING SPECIFIED ACICULAR RATIO RELATIONSHIP BETWEEN NON-MAGNETIC AND FERROMAGNETIC PARTICLES

(75) Inventors: Kiyomi Ejiri, Kanagawa (JP); Masahiko Mori, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 176 days.

(21) Appl. No.: 09/828,767

(22) Filed: Apr. 9, 2001

(65) Prior Publication Data

US 2002/0018915 A1 Feb. 14, 2002

(30) Foreign Application Priority Data

Apr. 10, 2000 (JP) ....................................... 2000-108247

(51) Int. Cl.[7] .................................................. B32B 5/16
(52) U.S. Cl. ......................... 428/694 BN; 428/694 BA; 428/694 BH
(58) Field of Search ...................... 428/694 B, 694 BN, 428/694 BA, 694 BH

(56) References Cited

U.S. PATENT DOCUMENTS 4,606,971 A * 8/1986 Ido et al. .................... 428/328
5,118,575 A * 6/1992 Maekawa et al. ........... 428/403
5,447,782 A * 9/1995 Inaba et al. ................. 428/212
5,503,911 A * 4/1996 Aoki et al. ................. 428/213
5,597,638 A * 1/1997 Saito et al. ................. 428/141
5,922,454 A * 7/1999 Inaba et al. ................. 428/328
6,143,403 A * 11/2000 Ejiri et al. .................. 428/323
6,383,605 B1 * 5/2002 Ejiri ........................... 428/141

* cited by examiner

*Primary Examiner*—H. Thi Le
(74) *Attorney, Agent, or Firm*—Stroock & Stroock & Lavan LLP

(57) ABSTRACT

A magnetic recording medium having on a flexible, non-magnetic support, in order, a lower layer comprising a nonmagnetic powder and a binder, and a magnetic layer comprising a ferromagnetic powder and a binder. The average thickness d of the magnetic layer is 0.02–0.2 $\mu$m. The ferromagnetic powder contained in the magnetic layer is a platelike hexagonal ferrite magnetic powder with a mean plate diameter of not more than 40 nm. The nonmagnetic powder contained in the lower layer is an acicular inorganic powder with a mean main axis length of not more than 0.2 $\mu$m. Further, the plate ratio of the ferromagnetic powder is not greater than the acicular ratio of the lower layer inorganic powder. A particulate magnetic recording material exhibiting a high C/N in high-density magnetic recording, particularly in reproduction with MR heads is provided.

14 Claims, No Drawings

MAGNETIC RECORDING MEDIUM HAVING SPECIFIED ACICULAR RATIO RELATIONSHIP BETWEEN NON-MAGNETIC AND FERROMAGNETIC PARTICLES

BACKGROUND OF THE INVENTION

1. Field of the Invention

The present invention relates to a particulate magnetic recording medium for high-density recording.

2. Description of Related Art

In recent years, recording wavelengths have tended to shorten as recording densities have increased. The problem of self-magnetization losses during recording, where output drops due to the thickness of the magnetic layer, has become significant. Thus, the magnetic layer has been reduced in thickness. However, when a magnetic layer of 2 μm or less is directly coated onto a support, the nonmagnetic support tends to affect the magnetic surface, and deterioration of electromagnetic characteristics and dropout tend to appear.

One means of solving this problem employs a method of forming a magnetic layer by a simultaneous multilayer coating method in which a nonmagnetic lower layer is provided on a support and a high-density magnetic coating solution is thinly applied (Japanese Patent Unexamined Publication Nos. Sho 63-191315 and Sho 63-187418). Such inventions have made it possible to achieve good electromagnetic characteristics with dramatically improved yields.

Magnetoresistive reproduction heads designed to further increase recording density have been brought into practical use with hard disks, and tests on flexible media such as metal evaporation tapes (ME) have been reported (IEEE. Trans. Mag. Vol. 35. No. 2, p. 729 (1999)).

Although magnetic recording media suited to reproduction with MR heads have been examined with regard to metal evaporation tapes (ME), there has not been adequate examination with regard to particulate magnetic recording media with good production and preservation properties.

Accordingly, an object of the present invention is to provide a particulate magnetic recording medium exhibiting a high C/N ratio in high-density magnetic recording, particularly when employing MR heads for reproduction.

SUMMARY OF THE INVENTION

The present invention relates to a magnetic recording medium comprising on a flexible nonmagnetic support, in order, a lower layer comprising a nonmagnetic powder and a binder, and a magnetic layer comprising a ferromagnetic powder and a binder, wherein an average thickness of said magnetic layer ranges from 0.02 μm to 0.2 μm; said ferromagnetic powder contained in said magnetic layer is a magnetic powder of platelike hexagonal ferrite with a mean plate diameter equal to or less than 40 nm; said nonmagnetic powder contained in said lower layer is an inorganic acicular powder with a mean major axis length equal to or less than 0.2 μm; and a plate ratio of said ferromagnetic powder is equal to or less than an acicular ratio of said inorganic powder of the lower layer.

The operating mechanism of the present invention will be described here.

Adopting a magnetic layer thickness of 0.02–0.2 μm permits improvement in the C/N resolution of digital recordings with MR heads. This is documented by reports of the results of experiments employing evaporation tapes (IEEE, Trans. Mag. Vol. 35, No. 2, p. 729 (1999) and the Picture Information Media Society Technical Reports, Vol. 23, No. 78, p. 21 (1999)). However, it is difficult to achieve magnetic layer film thicknesses in coated media equivalent to those of thin metal films. Further, in coated media, with magnetic alloy powders yielding high performance with conventional inductance heads, there is significant noise during reproduction with MR heads and saturation tends to occur, precluding high C/N ratios. In the present invention, a magnetic layer with low magnetic nonuniformity can be achieved by providing a magnetic layer comprising a magnetic powder of hexagonal ferrite of small (mean plate diameter=40 nm) particle size over a nonmagnetic lower layer comprising a nonmagnetic powder having a mean major axis length of 0.2 μm or less and an acicular ratio greater than the plate ratio of the magnetic powder.

In the present invention, incorporating a nonmagnetic powder with a higher acicular ratio than the magnetic particles into the nonmagnetic lower layer permits improvement in the flow orientation properties of the lower layer, improvement in the orientation of magnetic material of micrograms tending not to assume orientations, and reduction in the variation in thickness of the magnetic layer. The relation whereby the upper layer acicular ratio is less than or equal to that of the lower layer acicular ratio is disclosed in Japanese Patent Unexamined Publication Nos Hei 8-102037 and Hei 9-106533. However, the present invention has been found to achieve never before seen results by incorporating a microgranular magnetic powder of hexagonal platelike ferrite. That is, since magnetic hexagonal ferrite materials have lower saturation magnetization than magnetic alloy powders, the thixotropic property of the coating solution is low and orientation reversion tends to occur. Accordingly, although mixing with the lower layer takes place during the coating drying process, resulting in significant orientation reversion, the use of the lower layer in the present invention has been found to yield good upper and lower film boundaries and orientation properties. This effect is marked when the platelike, ferromagnetic powder (magnetic material of hexagonal ferrite) is oriented in a vertical direction. Further, the greater the acicular ratio of the lower layer magnetic powder, the better the molding properties during calendering, so it was found that by compensating for the fact that magnetic layers are difficult to form when using microgranular magnetic materials with low void rates in the film-forming stage, good surface properties could be achieved.

The following are desirable forms of the magnetic recording medium of the present invention:

(1) The mean grain volume of the ferromagnetic powder ranges from 1,500 to 15,000 $nm^3$, and the coercivity Hc of the magnetic layer in the longitudinal direction is 167 KA/m (2,100 Oe) or greater;

(2) The squareness of the magnetic layer in the vertical direction SQ⊥ is 0.3 or greater and the coercivity in the vertical direction Hc⊥ is 119 KA/m (1,500 Oe) or greater; and (3) The mixing in of 10–30 parts of granular particles with a mean primary grain diameter of 50 nm or less and a true specific gravity of 5 or less per 100 parts of acicular material in the nonmagnetic lower layer is desirable to achieve uniform formation of the above-described thin magnetic layer.

The mean grain volume of the ferromagnetic powder is preferably 1,500–15,000 $nm^3$ from the perspective of noise reduction, and the Hc is preferably 167 KA/m (2,100 Oe) or greater to maintain stable recording magnetization. A grain volume of 1,500 $nm^3$ or greater and an Hc of 167 KA/m (2,100 Oe) or greater maintains good thermal stability of recording magnetization. When the grain volume is 15,000 $nm^3$ or less, noise is controlled and an adequate C/N ratio can be achieved. Due to recording principles, a large coercivity Hc is desirable, but when the recording head capacity is considered, 175–279 KA/m (2,200–3,500 Oe) is actually suitable.

An SQ⊥ in the vertical direction of the magnetic layer of 0.3 or greater and an Hc⊥ in the vertical direction of 119 KA/m (1500 Oe) or greater are advantageous to effectively exploit the vertical magnetization component and achieve good resolution.

Further, mixing in 10–30 parts of granular particles with a mean primary grain diameter of 50 nm or less and a true specific gravity of 5 or less per 100 parts of acicular material in the nonmagnetic layer forms voids between the acicular grains in the film, improves forming properties during calendering, and yields good surface properties.

[The Magnetic Layer]

In the magnetic recording medium of the present invention, a suitable average magnetic layer thickness (d) is 0.02–0.2 μm, preferably 0.03–0.15 μm.

The object of the present application can be achieved with a single layer or multilayered magnetic layer. When employing multiple magnetic layers, the technique described in Japanese Patent Unexamined Publication No. Hei 6-139555 can be applied, for example. Since the magnetic layer is thin in the present invention and a saturated recording state occurs, no variation in the thickness of the magnetic layer is desirable. However, so long as the relation between the standard deviation σ in the recording layer thickness and d (σ/d) is equal to or smaller than 0.5, variation can be permitted in practical terms. σ/d is preferably equal to or smaller than 0.3.

An example of a specific method of reducing is to employ a thixotropic magnetic coating solution for the lower layer, as described in Japanese Patent No. 2566096. There is a wet-on-dry method of applying the magnetic upper layer after coating and drying the nonmagnetic lower layer employing an acicular nonmagnetic powder in the lower layer. Employing an acicular nonmagnetic powder of larger acicular ratio than the magnetic material as specified in the present invention and further mixing in microgranular powder with a true specific gravity of 5 or less permits a reduction in the standard deviations σ.

The residual magnetization level ϕr of the magnetic layer is desirably 5–50 mT·μm (50–500 G·μm). ϕr is optimized within the range at which the MR head employed does not saturate. For example, the relation between ϕr in an evaporation tape and the saturation magnetization thickness of an MR element is disclosed in Japanese Patent Unexamined Publication No. Hei 10-134306 and the Picture Information Media Society Technical Reports, Vol. 23, No.78, p.21 (1999). The coated (particulate) medium also desirably satisfies the same relation. Examples of methods of setting the residual magnetization level include varying the quantity of binder employed and varying the saturization magnetization of the magnetic material employed. A suitable volume fill rate of the ferromagnetic powder is 30 percent or greater, preferably 35 percent or greater, and still more preferably, 38 percent or greater.

A suitable σs in the ferromagnetic powder is 50–70 $Am^2/kg$ (50–70 emu/g). A suitable average plate diameter is 40 nm or less, preferably 10–35 nm or less. A suitable plate thickness in the ferromagnetic powder is 5–20 nm, preferably 8–15 nm. A suitable acicular ratio (major axis length/minor axis length) in the ferromagnetic powder is 2–15, preferably 3–8.

Substitution products of barium ferrite, strontium ferrite, lead ferrite, and calcium ferrite, Co substitution products or the like, and hexagonal Co powders can be employed as the hexagonal ferrite. Specific examples are magnetoplumbite-type barium ferrite and strontium ferrite, as well as magnetoplumbite type barium ferrite and strontium ferrite partly containing a spinel phase. The following may be incorporated in addition to other prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, and the like. Compounds to which elements such as Co—Ti, Co—Ti—Zr, Co—Ti—Zn, Ni—Ti—Zn, and Ir—Zn have been added may generally also be employed. The compounds of particular preference are Co substitution products of barium ferrite and strontium ferrite.

The hexagonal ferrite employed in the present invention is normally a hexagonal platelike grain. The grain diameter refers to the width of the plate of the hexagonal grain as measured by electron microscopy. In the present invention, the grain diameter (plate diameter) is specified within the range of 0.01–0.2 μm, more preferably 0.02–0.1 μm. Further, the mean thickness (plate thickness) of the grains is 0.001–0.2 μm, more preferably 0.003–0.05 μm. Further, the plate ratio (grain diameter/plate thickness) is 1–15, more preferably 3–7. The specific surface area (SBET) of the hexagonal ferrite micropowder as measured by the BET method is 25–100 $m^2/g$, more preferably 40–70 $m^2/g$. At less than 25 $m^2/g$, noise increases, and at greater than 100 $m^2/g$, surface properties deteriorate; such levels are thus undesirable. The saturation magnetization (σs) of the magnetic material is 50 $Am^2/kg$ (50 emu/g) or greater, preferably 60 $Am^2/kg$ (60 emu/g) or greater. The tap density is preferably 0.5 g/mL or greater, more preferably 0.8 g/mL or greater.

The following atoms may be incorporated into the magnetic powder in addition to other prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B and the like. To improve thermal stability, Al, Si, Ta, Y, and the like may be adhered to or solved into the surface. The magnetic powder may be pretreated prior to dispersion with a dispersing agent, lubricant, surfactant, antistatic agent, or the like.

Known binders can be employed in the magnetic layer; examples are described in Japanese Patent Nos. 2566096 and 2571351. These binders preferably incorporate a functional group ($SO_3M$, $PO_3M$, or the like) to promote adhesion to the magnetic powder; incorporation of an epoxy group is also desirable. The molecular weight is 10,000–100,000, preferably 20,000–60,000. The quantity employed is 5–25 parts, preferably 5–20 parts, and more preferably 5–15 parts per 100 weight parts of magnetic powder.

The magnetic layer may also incorporate a known abrasive such as α-alumina or $Cr_2O_3$. The mean grain diameter of the abrasive for wet-on-wet application is not less than ⅓ and not more than five times the magnetic layer thickness, and for wet-on-dry application, not less than ⅓ and no more than two times the thickness of the magnetic layer. When excessively large, noise dropout results. Since abrasives especially tend to cause protrusions in wet-on-dry application, a microgranular abrasive is preferred. Known techniques may be employed for pH and surface treatment. In addition, solid lubricants (carbon with a grain diameter of not less than 30 nm) and liquid lubricants such as fatty acids and fatty esters may also be added.

[The Nonmagnetic Layer (Lower Layer)]

The nonmagnetic powder employed as the chief component of the nonmagnetic lower layer is characterized by being acicular, having an average major axis length of not more than 0.2 $\mu$m, preferably 0.05–0.15 $\mu$m, and having an acicular ratio smaller than that of the magnetic powder in the magnetic layer.

The acicular ratio of the lower layer powder is preferably 5–20, and more preferably satisfies the relation of 0.3≦acicular ratio of upper magnetic material/acicular ratio of lower layer nonmagnetic powder≦0.9. Specifically, an acicular metal oxide of not less than pH 5 is particularly desirable in the present application. Such powders disperse well since they have high adhesive properties with the functional group in the binder, and have high mechanical strength in films.

In other preferred forms of the nonmagnetic powder, an oil absorption employing DBP of 5–100 mL/100 g, preferably 10–80 mL/100 g, and more preferably 20–60 mL/100 g is appropriate. The specific gravity is 1–12, preferably 3–6, and the ignition loss is preferably not more than 20 weight percent.

The nonmagnetic powder employed in the present invention desirably has a Mohs hardness of not less than 4. The powder surface desirably has a roughness factor of 0.8–1.5, preferably 0.9–1.2. Stearic acid (SA) absorption is 1–20 $\mu$mol/m$^2$, preferably 2–15 $\mu$mol/m$^2$. The heat of wetting in water at 25° C. of the lower layer nonmagnetic powder desirably ranges from 20–60 $\mu$J/cM$^2$ (200 erg/cm$^2$–600 erg/cm$^2$). Further, solvents falling within this heat of wetting range may also be employed. The number of surface water molecules at 100–400° C. is suitably 1–10/100 A.

The pH at the isoelectric point in water is preferably 5–10.

The surface of the powder is preferably treated with $Al_2O_3$, $SiO_2$, $TiO_2$, $ZrO_2$, $SnO_2$, $Sb_2O_3$ or ZnO. Particularly good dispersability is achieved with $Al_2O_3$, $SiO_2$, $TiO_2$, and $ZrO_2$. These may be employed singly or in combination. Depending on the objective, a coprecipitated surface treatment layer may be employed; a structure achieved by an alumina treatment followed by treatment of the surface layer with silica, or the reverse, may be adopted. The surface-treated layer may be a porous layer depending on the objective, but a homogeneous, dense layer is generally preferable. Examples of such acicular powders are oxides and nonmagnetic metals such as $TiO_2$, hematite, α-alumina, γ-alumina, $ZrO_2$, $CeO_2$, $Cr_2O_3$, and $SiO_2$.

In addition to the above-described acicular nonmagnetic powder, 5–30 parts of a granular powder with a mean grain size of not more than 50 nm, preferably not more than 40 nm, and a true specific gravity of not more than 5 are desirably incorporated into the lower layer per 100 parts of acicular nonmagnetic powder. Oxides, nonmagnetic metals, organic resin fillers, carbon black, and the like, such as $TiO_2$, hematite, alumina, $ZrO_2$, $CeO_2$, $Cr_2O_3$, and $SiO_2$ may be employed. Carbon black with a mean grain size of 30 nm or less is particularly suitable.

The same binder as employed in the magnetic upper layer may be employed in the lower layer. However, it is desirable to incorporate a functional group (as described above) to enhance dispersability, and the molecular weight is 20,000–50,000, preferably 30,000–50,000. An excessively high molecular weight tends to compromise calender forming results. Surface treatment with alumina or an aromatic phosphorus compound to promote dispersion in the nonmagnetic material is also desirable.

For details, the descriptions in Japanese Patent Nos. 2566088 and 2634792 may be consulted.

The lower layer is suitably 0.3–3 $\mu$m, preferably 0.5–2 $\mu$m, in thickness.

The polyisocyanates given below may also be employed as binders in the upper layer and lower layer of the present invention: tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate or the like, products of these isocyanates with polyalcohols, or polyisocyanates produced by condensation of isocyanates. These isocyanates are commercially available under the following trade names: Coronate L, Coronate HL, Coronate 2030, Coronate 2031, Millionate MR and Millionate MTL, manufactured by Nippon Polyurethane Co. Ltd.; Takenate D-102, Takenate D-110N, Takenate D-200 and Takenate D-202, manufactured by Takeda Chemical Industries Co. Ltd.; Desmodule L, Desmodule IL, Desmodule N and Desmodule HL, manufactured by Sumitomo Bayer Co. Ltd. and so on. They can be used singly or in combinations of two or more by exploiting differences in curing reactivity in both the nonmagnetic layer and the magnetic layer.

Examples of types of carbon black suitable for use in the upper layer of the present invention are: furnace black for rubber, thermal for rubber, black for coloring, and acetylene black. A specific surface area of from 5 to 500 m$^2$/g, an amount of DBP oil absorption of from 10 to 400 mL/100 g, a grain diameter of from 5 nm to 300 nm, a pH of from 2 to 10, a moisture content of from 0.1 to 10 weight percent and a tap density of from 0.1 to 1 g/mL are desirable. Specific examples of types of carbon black employed in the present invention are: BLACK PEARLS 2000, 1300, 1000, 900, 800, 700 and VULCAN XC-72, manufactured by Cabot Corporation; #80, #60, #55, #50 and #35, manufactured by Asahi Carbon Co. Ltd.; #2400B, #2300, #900, #1000, #30, #40 and #10B, manufactured by Mitsubishi Chemical Corp.; and CONDUCTEX SC, RAVEN 150, 50, 40 and 15, manufactured by Columbia Carbon Co. Ltd. The carbon black employed may be surface-treated with a dispersant or grafted with resin, or have a partially graphitized surface. The carbon black may be dispersed in advance into the binder prior to addition to the coating solution. These carbon blacks may be used singly or in combination.

When employing a carbon black, the quantity employed is preferably 0.1–30 weight percent.

Carbon black works to prevent static in the magnetic layer, reduce the friction coefficient, impart light-blocking properties, enhance film strength, and the like; the properties vary with the type of carbon black used. Accordingly, the type, quantity, and combination of carbon black employed in the present invention may be determined separately for the upper magnetic layer and the lower layer, based on the objective and the various characteristics stated above, such as grain size, oil absorption amount, electrical conductivity, and pH. For example, the *Carbon Black Handbook* compiled by the Carbon Black Association may be consulted for the type of carbon black to employ in the magnetic layer of the present invention.

Chiefly, known materials with a Mohs hardness of 6 or greater may be employed singly or in combination as the abrasive of the present invention. Examples are α-alumina having an α-conversion rate of not less than 90 percent, β-alumina, silicon carbide, chromium oxide, cerium oxide, α-iron oxide, corundum, artificial diamond, silicon nitride, silicon carbide, titanium carbide, titanium oxide, silicon dioxide and boron nitride. Further, a composite comprising two or more of these abrasives (an abrasive obtained by surface-treating one abrasive with another) may also be used. Although these abrasives may contain compounds and elements other than the main component in some cases, the same effect is obtainable if the content of the main component comprises not less than 90 weight percent. A tap density of 0.3–2 g/mL, a moisture content of 0.1–5 weight percent, a pH of 2–11, and a specific surface area of 1–30 $m^2$/g are desirable. The abrasive employed in the present invention may be acicular, spherical, or cubic in shape, but shapes that are partially angular have good abrasion properties and are thus preferred. Specific examples of abrasives employed in the present invention are: AKP-20, AKP-30, AKP-50, HIT-50, and HIT-100, manufactured by Sumitomo Chemical Co. Ltd.; G5, G7 and S-1, manufactured by Nippon Chemical Industrial Co. Ltd.; and TF-100 and TF-140, manufactured by Toda Kogyo K.K. It is, of course, possible in the present invention to separately determine the type, quantity, and combination of abrasive employed in the magnetic layers (upper and lower layers) of the present invention, based on the objective. These abrasives may be added to the magnetic application solution after being dispersion treated in advance with binder.

Substances having lubricating effects, antistatic effects, dispersive effects, plasticizing effects, or the like, may be employed as additives in the present invention. Examples are: molybdenum disulfide; tungsten graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; fluorine-containing alkylsulfuric esters and their alkali metal salts; monobasic fatty acids having 10 to 24 carbon atoms (which may contain an unsaturated bond or may be branched) and metal (e.g., Li, Na, K, Cu) salts thereof; monohydric, dihydric, trihydric, tetrahydric, pentahydric and hexahydric alcohols having 12 to 22 carbon atoms (which may contain an unsaturated bond or be branched); alkoxy alcohols having 12 to 22 carbon atoms; monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); fatty esters of monoalkyl ethers of alkylene oxide polymers; fatty acid amides having 8 to 22 carbon atoms; and aliphatic amines having 8 to 22 carbon atoms.

Specific examples of compounds suitable for use are: lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, or sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines.

Details of these surfactants are described in "A Guide to Surfactants" (published by Sangyo Tosho K.K.). These lubricants, antistatic agents and the like need not be 100 percent pure and may contain impurities, such as isomers, unreacted materials, by-products, decomposition products and oxides, in addition to the main components. These impurities are preferably comprised not more than 30 percent, and more preferably not more than 10 percent, by weight.

The lubricants and surfactants that are employed in the present invention may be employed differently in the lower layer and magnetic upper layer, as needed, based on type and quantity. For example, it is conceivable to control bleeding onto the surface through the use in the lower layer and the magnetic upper layer of fatty acids having different melting points, to control bleeding onto the surface through the use of esters having different boiling points and polarities, to improve coating stability by adjusting the amount of surfactant, and to enhance the lubricating effect by increasing the amount of the lubricant added to the nonmagnetic layer; this is not limited to the examples given here. All or some of the additives used in the present invention may be added at any stage of the process of manufacturing the magnetic application solution. For example, they may be mixed with the ferromagnetic powder before a kneading step; added during a step of kneading the ferromagnetic powder, the binder, and the solvent; added during a dispersing step; added after dispersing; or added immediately before coating. Part or all of the additives may be applied by simultaneous or sequential coating after the magnetic layer has been applied to achieve a specific purpose. Depending on the objective, the lubricant may be coated on the surface of the magnetic layer after calendering or making slits.

Examples of the trade names of lubricants suitable for use in the present invention are: NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hydrogenated castor oil fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, butyl stearate, butyl laurate, and erucic acid, manufactured by NOF Corp.; oleic acid, manufactured Kanto Chemical Co. Ltd; FAL-205 and FAL-123, manufactured by Takemoto Yushi K.K.; EJLUB LO, EJLUB IPM, and Sansosyzer E4030, manufactured by New Japan Chemical Co. Ltd.; TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910 and KF-3935, manufactured by Shinetsu Chemical Co. Ltd.; Armide P, Armide C and Armoslip CP, manufactured by Lion Armour K.K.; Duomine TDO, manufactured by Lion Yushi K.K.; BA-41G, manufactured by Nisshin Oil Mills, Co. Ltd.; Profan 2012E, Newpole PE61, Ionet MS-400, Ionet MO-200, Ionet DL-200, Ionet DS-300, Ionet DS-1000 and Ionet DO-200, manufactured by Sanyo Chemical Industries Co. Ltd.

The organic solvent employed in the present invention may be used in any ratio. Examples are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons, such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane. These organic solvents need not be 100 percent pure and may contain impurities such as isomers, unreacted materials, by-products, decomposition products, oxides and moisture in addition to the main components. The content of these impurities is preferably not more than 30 percent, more preferably not more than 10 percent. Preferably the same type of organic solvent is employed in the present invention for the magnetic layer coating solution and nonmagnetic layer coating solution. However, the amount added may be varied. The stability of coating is increased by using a solvent with a high surface tension (such as cyclohexane or dioxane) in the nonmagnetic layer. Specifically, it is important that the arithmetic mean value of the upper layer solvent composition be not less than the arithmetic mean value of the lower layer solvent composition. To improve dispersion properties, a solvent having a somewhat strong polarity is desirable. It is desirable that solvents having a dielectric constant of 15 or more are comprised not less than 50 percent of the solvent composition. Further, the dissolution parameter is desirably from 8 to 11.

The thickness of the flexible nonmagnetic support of the magnetic recording medium of the present invention is suitably from 1 to 100 μm, preferably from 3 to 80 μm. An under-coating layer can be provided between the flexible nonmagnetic support and the lower layer to improve adhesion. The thickness of this under-coating layer is from 0.01 to 2 μm, preferably from 0.02 to 0.5 μm. In addition, a backcoat layer may be provided on the opposite side of the nonmagnetic support from the magnetic layer side. The thickness thereof is from 0.1 to 2 μm, preferably from 0.3 to 1.0 μm. Publicly known under-coating layers and backcoat layers can be employed.

Publicly known films can be employed as the flexible nonmagnetic support in the present invention, including polyesters such as polyethylene terephthalate and polyethylene naphthalate, polyolefins, cellulose triacetate, polycarbonates, polyamides, polyimides, polyamidoimides, polysulfones, aramide, and aromatic polyamides.

These supports may be subjected beforehand to corona discharge treatment, plasma treatment, adhesion enhancing treatment, heat treatment, dust removal, and the like.

When the nonmagnetic support employed in the present invention is a tape, Young's modulus in the MD direction is 3.92–14.7 GPa (400–1,500 kg/ $mm^2$), preferably 4.9–12.75 GPa (500–1,300 $kg/mm^2$). Young's modulus in the TD direction is 4.9–19.6 GPa (500–2,000 $kg/mm^2$), preferably 6.9–17.6 GPa (700–1800 $kg/mm^2$), and the ratio of TD/MD is 1/1–1/5, preferably 1/1–1/3.

The thermal shrinkage rate at 100° C. at 30 minutes in the tape running direction and the crosswise direction of the support is preferably not more than 3% and more preferably not more than 1.5 percent, and at 80° C. at 30 minutes, preferably not more than 1 percent, and more preferably 0.5 percent or less. The break strength in both directions is preferably 5–100 $kg/mm^2$.

The process for manufacturing the magnetic application solution for the magnetic recording medium of the present invention comprises at least a kneading step, a dispersing step, and a mixing step to be carried out, if necessary, before or after the kneading and dispersing steps. Each of the individual steps may be divided into two or more stages. All of the starting materials employed in the present invention, including the ferromagnetic powder, binders, carbon black, abrasives, antistatic agents, lubricants, solvents, and the like, may be added at the beginning or during any of the steps. Moreover, the individual materials may be divided and added during two or more steps; for example, polyurethane may be divided and added in the kneading step, the dispersing step, and the mixing step for viscosity adjustment after dispersion.

To achieve the object of the present invention, conventionally known manufacturing techniques may, of course, be utilized for some of the steps. In the kneading step, only by using a kneader having a strong kneading force, such as a continuous kneader or a pressure kneader, it was possible to obtain the high residual magnetic flux density (Br) of the magnetic recording medium of the present invention. When a continuous kneader or pressure kneader is employed, the ferromagnetic powder and all or part of the binder (preferably not less than 30 percent of the entire quantity of binder) are kneaded in the range of from 15 to 500 parts of binder per 100 parts of ferromagnetic powder. Details of the kneading treatment are described in Japanese Patent Unexamined Publication Nos. Hei 1-106338 and Sho 64-79274. When preparing the lower nonmagnetic layer solution, a dispersing medium having a high specific gravity is desirably utilized, with zirconia beads being suitable.

The following are examples of devices and methods for coating the multilayered structure of the magnetic recording medium of the present invention.

1. The lower layer is first applied with a coating device commonly employed to apply magnetic application solutions such as a gravure coating, roll coating, blade coating, or extrusion coating device, and the upper layer is applied while the lower layer is still wet by means of a support pressure extrusion coating device such as is disclosed in Japanese Patent Examined Publication No. Hei 1-46186 and Japanese Patent Unexamined Publication Nos. Sho 60-238179 and Hei 2-265672.

2. The upper and lower layers are applied nearly simultaneously by a single coating head having two built-in slits for passing coating solution, such as is disclosed in Japanese Patent Unexamined Publication Nos. Sho 63-88080, Hei 2-17971, and Hei 2-265672.

3. The upper and lower layers are applied nearly simultaneously using an extrusion coating apparatus with a backup roller as disclosed in Japanese Patent Unexamined Publication No. Hei 2-174965.

To prevent compromising the electromagnetic characteristics or the like of the magnetic recording medium by aggregation of ferromagnetic powder, shear is desirably imparted to the coating solution in the coating head by a method such as disclosed in Japanese Patent Unexamined Publication Nos. Sho 62-95174 or Hei 1-236968. In addition, the viscosity of the coating solution must satisfy the numerical range specified in Japanese Patent Unexamined Publication No. Hei 3-8471. To obtain the magnetic recording medium of the present invention, orientation is conducted following drying. A solenoid of not less than 100 mT (1,000 G) and a cobalt magnet of not less than 200 mT (2,000 G) are desirably employed together in orientation with like poles opposed (in a same manner that the same polarities of those above to each other). It is also desirable to provide a suitable drying step prior to orientation so as to achieve the highest orientation property following drying. Further, when the present invention is being applied as a disk medium, an orientation method achieving random orientation is rather required.

Heat-resistant plastic rollers of epoxy, polyimide, polyamide, polyimidoamide, or the like, are employed as calender processing rollers. Processing may also be conducted with metal rollers. The processing temperature is preferably not less than 70° C., more preferably not less than 80° C. Linear pressure is preferably 200 kg/cm or more, more preferably 300 kg/cm or more. The friction coefficient for SUS420J of the magnetic layer surface of the magnetic recording medium of the present invention and its opposite surface is preferably not more than 0.5, more preferably not more than 0.3. The surface resistivity is preferably from $10^4$ to $10^{12}$ Ω/sq, the modulus of elasticity at 0.5% elongation of the magnetic layer in both the running direction and the width direction is preferably 0.98–19.6 GPa (100 to 2,000 $kg/mm^2$) and the break strength is preferably 0.98–29.4 GPa (from 1 to 30 $kg/cm^2$). The modulus of elasticity of the magnetic recording medium in both the running direction and the longitudinal direction is preferably from 0.98–14.7 GPa (100 to 1,500 $kg/mm^2$) and the residual elongation is preferably not more than 0.5 percent. The thermal shrinkage rate at any temperature not greater than 100° C. is preferably not greater than 1 percent, more preferably not greater than 0.5%, and most preferably not greater than 0.1%. The glass transition temperature (i.e., the temperature at which the loss elastic modulus of dynamic viscoelasticity is measured at 110 Hz peaks) of the magnetic layer is preferably not less than 50° C. and not more than 120° C., and that of the lower layer is preferably 0° C.–100° C. The loss elastic modulus preferably falls within a range of from $1\times10^7$ to $8\times10^8$ $N/m^2$ ($1\times10^8$ to $8\times10^9$ $dyne/cm^2$) and the loss tangent is preferably not more than 0.2. Adhesion failure tends to occur when the loss tangent becomes excessively large.

The residual solvent in the magnetic layer is preferably not more than 100 $mg/m^2$ and more preferably not more than 10 $mg/m^2$. The void ratio in both the lower layer and the magnetic layer is preferably not more than 30 volume percent, more preferably not more than 20 volume percent. Although a low void percentage is preferable for attaining high output, there are some cases in which it is better to maintain a certain level. For example, in magnetic recording media for data recording where repeat applications are important, higher void ratios often result in better running durability. As regards the magnetic characteristics of the magnetic recording medium of the present invention, when measured under a magnetic field of 500 mT (5 KOe), squareness in the tape running direction is not less than 0.70, preferably not less than 0.75, and more preferably not less than 0.85.

Squareness in the two directions perpendicular to the tape running direction is preferably not more than 80 percent of the squareness in the running direction. The switching field distribution (SFD) of the magnetic layer is preferably not more than 0.6.

In the roughness spectrum of the surface of the magnetic layer, the power spectrum density of roughness in the. wavelength of from 1 to 5 μm is 0.2 $nm^2$ or less, and the power spectrum density of roughness in the wavelength of from 0.5 to 1.0 μm is 0.02–0.1 $nm^2$. To achieve a good CNR, the lower power spectrum density of roughness the better, but to improve running durability, it is necessary to keep the power spectrum density of roughness in the wavelength of from 0.5 to 1.0 μm to 0.02–1.0 $nm^2$.

The magnetic recording medium of the present invention comprises a lower layer and an upper magnetic layer. It will be readily understood that the physical characteristics of the lower layer and the magnetic layer can be changed based on the objective. For example, the magnetic layer can be imparted with a high modulus of elasticity to improve running durability while at the same time imparting to the lower layer a lower modulus of elasticity than that of the magnetic layer to improve head contact with the magnetic recording medium. What physical characteristics to impart to two or more magnetic layers can be determined by consulting techniques relating to known magnetic multilayers. For example, there are many inventions imparting a higher Hc to the upper magnetic layer than to the lower layer, such as disclosed in Japanese Patent Examined Publication No. Sho 37-2218 and Japanese Patent Unexamined Publication No. Sho 58-56228. However, making the magnetic layer thin, as in the present invention, permits recording on a magnetic layer of comparatively high Hc.

The present invention relates to the subject matter contained in Japanese Patent Application No. 2000-108247, filed on Apr. 10, 2000, which is expressly incorporated herein by reference in its entirety.

EMBODIMENTS

The detailed contents of the present invention are described specifically below through embodiments. In the embodiments, "parts" denote "weight parts".

| (1) Lower layer | |
|---|---|
| Nonmagnetic powder $\alpha$-$Fe_2O_3$ | 80 parts |
| Mean length of major axis: 0.1 μm | |
| Acicular ratio: 8.5 | |
| Specific surface area by BET method: 56 $m^2/g$ | |
| pH 8, $Fe_2O_3$ content: not less than 90 percent | |
| DBP oil absorption amount: 27–38 ml/100 g | |
| Surface treatment agent: $Al_2O_3$ | |
| Carbon black | 20 parts |
| Average primary particle diameter: 16 nm | |
| DBP oil absorption: 80 mL/100 g | |
| pH: 8.0 | |
| Specific surface area by BET method: 250 $m^2/g$ | |
| Volatile content: 1.5% | |
| Vinyl chloride copolymer | 10 parts |
| MR-110, manufactured by Nippon Zeon Co. Ltd. | |
| Polyester polyurethane resin | 5 parts |
| Molecular weight: 35,000 | |
| Neopentylglycol/Caprolactonepolyol/ | |
| MDI = 0.9/2.6/1 | |
| Containing $1 \times 10^{-4}$ eq/g of —$SO_3Na$ group | |
| Butyl stearate | 1 part |
| Stearic acid | 1 part |
| Methyl ethyl ketone | 100 parts |
| Cyclohexanone | 50 parts |
| Toluene | 50 parts |
| (2) Magnetic Layer | |
| Barium ferrite magnetic powder | 100 parts |
| Hc 199 KA/m (2,500 Oe) | |
| Specific surface volume by BET method 65 $m^2/g$ | |
| Surface treatment agent: $Al_2O_3$ | |
| Grain size (plate diameter) 25 nm | |
| Plate ratio: 5 | |
| σs: 58A · $m^2/kg$ (58 emu/g) | |
| Vinyl chloride copolymer | 5 parts |
| MR-110, manufactured by Nippon Zeon Co. Ltd. | |

-continued

| | |
|---|---|
| Polyester polyurethane resin<br>Neopentylglycol/Caprolactonepolyol/<br>MDI = 0.9/2.6/1<br>Containing $1 \times 10^{-4}$ eq/g of —$SO_3Na$ group | 3 parts |
| α-Alumina (grain size 0.1 μm) | 5 parts |
| Carbon black (grain size 0.10 μm) | 0.5 parts |
| Butyl stearate | 1.5 parts |
| Stearic acid | 0.5 parts |
| Methyl ethyl ketone | 90 parts |
| Cyclohexanone | 30 parts |
| Toluene | 60 parts |

Each of the above two application solutions were dispersed using a sand mill after the individual components had been kneaded in a continuous kneader. Polyisocyanate was added to the dispersion obtained; three parts to the coating solution for the lower layer, and one part to the coating solution for the upper magnetic layer. Forty parts of a mixed solvent of methyl ethyl ketone and cyclohexanone were added to each solution. Each solution was then filtered using a filter with a mean pore diameter of 1 μm to prepare coating solutions for forming the lower layer and the upper magnetic layer. Simultaneous multilayer coating was conducted by applying the coating solution for the lower layer in a manner yielding a dried thickness of 1.2 μm on a polyethylene naphthalate support 5.5 μm thick and having MD and TD Young's moduli of 5.88 and 8.82 GPa (600, 900 kg/m$^3$), and applying the coating solution for the upper magnetic layer immediately thereafter in a manner yielding an upper magnetic layer 0.05 μm in thickness. While the two layers were still wet, longitudinal orientation was imparted with a two-pole opposed cobalt magnet having a magnetic force of 300 mT (3,000 G) and a solenoid having a magnetic force of 150 mT (1500 G). Once longitudinal orientation had been imparted with the 300 mT (3,000 G) two-pole opposed cobalt magnet while the two layers were still wet, vertical orientation was imparted with the solenoid having a magnetic force of 150 mT (1,500 G) in a vertical direction, the solutions were dried, a seven-stage calender comprised of only metal rollers was used for processing at 90° C., and slits 8 mm in width were made to manufacture an 8 mm video tape.

Evaluation Methods (1) The C/N ratio was tested with a drum tester. The head employed was an MIG reproduction head with a Bs of 1.2 T and a gap length of 0.22 μm. Reproduction was conducted using a shielded MR head with a shield gap of 0.2 μm where the Bs of the MR film was 1.2 T. The relative speed of the head/medium during reproduction was 10.5 m per second, a 21 MHz single-frequency signal was recorded, and the reproduced spectrum was measured using a Spectral Analyzer, manufactured by Shibasoku. C/N was determined with a 21 MHz carrier output and 19 MHz noise.

(2) Thickness Measurement

The sample tape was cut with a diamond cutter to a thickness of about 0.1 μm in the longitudinal direction, measured, and photographed at a magnification of 100,000× with a transmission electron microscope; lines were drawn at the boundary of the magnetic layer/lower layer; and measurements were made with an IBAS2 Image Processor from Zeiss. When the measurement length was 21 cm, 85–300 measurements were made, and the average value d and the standard deviation σ were calculated.

(3) Ra Measurement

The centerline average roughness of the surface of the magnetic layer was obtained with a TOPO-3D from WYKO Co.

(4) SQ, Hc

Measured under an external magnetic field of 10 KOe by VSM.

TABLE 1

| | Orientation | Emb. 1 Longitudinal | Emb. 2 Longitudinal | Emb. 3 Longitudinal | Emb. 4 Longitudinal | Emb. 5 Longitudinal | Emb. 6 Longitudinal | Emb. 7 Vertical | Emb. 8 Vertical | Emb. 9 Vertical |
|---|---|---|---|---|---|---|---|---|---|---|
| Magnetic Upper Layer | Thickness | 0.1 | 0.06 | 0.18 | 0.1 | 0.1 | 0.1 | 0.1 | 0.06 | 0.18 |
| | Plate diameter | 25 | 18 | 35 | 35 | 25 | 25 | 25 | 18 | 35 |
| | Plate ratio | 5 | 3 | 7 | 4 | 5 | 5 | 5 | 3 | 7 |
| | Hc (KA/m) | 191 | 255 | 171 | 191 | 191 | 191 | 191 | 255 | 171 |
| | Vol. of magnetic material | 4060 | 2500 | 8000 | 13900 | 4060 | 4060 | 4060 | 2500 | 8000 |
| | Magnetic layer SQ ⊥ | 0.4 | 0.44 | 0.39 | 0.42 | 0.34 | 0.37 | 0.8 | 0.83 | 0.78 |
| | Magnetic layer Hc (KA/m) ⊥ | 140 | 156 | 127 | 143 | 134 | 131 | 181 | 235 | 162 |
| Lower Layer Powder | Type | Acicular hematite | Acicular hematite | Acicular hematite | Acicular hematite | Acicular hematite | Acicular hematite | Acicular hematite | Acicular hematite | Acicular hematite |
| | Main axis length | 0.1 | 0.1 | 0.1 | 0.17 | 0.06 | 0.1 | 0.1 | 0.1 | 0.1 |
| | Acicular ratio | 8.5 | 8.5 | 8.5 | 10 | 7 | 8.5 | 8.5 | 8.5 | 8.5 |
| | Upper acic. ratio/ lower acic. ratio | 0.59 | 0.35 | 0.82 | 0.4 | 0.714285 7 | 0.588235 29 | 0.59 | 0.35 | 0.82 |
| | Type of granular particle | carbon | carbon | carbon | carbon | carbon | $TiO_2$ | carbon | carbon | carbon |
| | True specific gravity | 1.6 | 1.6 | 1.6 | 1.6 | 1.6 | 4.2 | 1.6 | 1.6 | 1.6 |
| | Mean particle diameter | 18 | 18 | 18 | 18 | 18 | 35 | 18 | 18 | 18 |
| | Content | 25 | 25 | 25 | 25 | 25 | 25 | 25 | 25 | 25 |
| Evaluation Results | Standard deviation of thickness σ | 0.02 | 0.02 | 0.028 | 0.028 | 0.035 | 0.03 | 0.022 | 0.015 | 0.012 |
| | Ra | 2.1 | 1.9 | 2.8 | 3.2 | 1.9 | 2.8 | 2.3 | 2.1 | 3 |
| | Reproduction output | −5 | −9 | −2.5 | −1.2 | −5.5 | −5.2 | −3 | −6 | −0.8 |
| | CNR | 7 | 5.8 | 4.5 | 3.8 | 6.1 | 5 | 9.1 | 7.6 | 6.8 |

TABLE 1-continued

| | Orientation | Emb. 10 Vertical | Emb. 11 Vertical | Com. Ex. 1 Longitudinal | Com. Ex. 2 Longitudinal |
|---|---|---|---|---|---|
| Magnetic Upper Layer | Thickness | 0.1 | 0.1 | 0.1 | 0.25 |
| | Plate diameter | 25 | 25 | Metal length 100 | 45 |
| | Plate ratio | 5 | 5 | Acicular ratio 6 | 7 |
| | Hc (KA/m) | 191 | 191 | 159 | 159 |
| | Vol. of magnetic material | 4060 | 4060 | 22700 | 16900 |
| | Magnetic layer SQ ⊥ | 0.76 | 0.74 | 0.19 | 0.35 |
| | Magnetic layer Hc (KA/m) ⊥ | 175 | 174 | 88 | 118 |
| Lower Layer Powder | Type | Acicular hematite | Acicular hematite | Acicular hematite | Acicular hematite |
| | Main axis length | 0.1 | 0.1 | 0.16 | 0.24 |
| | Aciculiar ratio | 8.5 | 8.5 | 8 | 6 |
| | Upper acic. ratio/ lower acic. ratio | 0.59 | 0.59 | 0.75 | 1.17 |
| | Type of granular particle | carbon | carbon | carbon | none |
| | True specific gravity | 1.6 | 1.6 | 1.6 | |
| | Mean particle diameter | 18 | 18 | 15 | |
| | Content | 12 | 35 | 10 | |
| Evaluation Results | Standard deviation of thickness σ | 0.038 | 0.032 | 0.03 | 0.15 |
| | Ra | 3.6 | 4.2 | 2.5 | 4.5 |
| | Reproduction output | −4.2 | −4.8 | 0 | −3.5 |
| | CNR | 8 | 7.3 | 0 | 0.8 |

Description of Embodiments and Comparative Examples

Electromagnetic characteristics were based on Comparative Example 1 (main axis length 0.1 μm, acicular ratio 6, σs 140 $Am^2/kg$ (140 emu/g), Hc 159 kA/m (2,000 Oe)) as reference (0 dB). This corresponds to Embodiment 1 in Japanese Patent Unexamined Publication No. Hei 8-102037.

In the results, an improvement of 2 dB or more was the criteria for improvement in C/N (generally, at 2 dB, there is a single-digit effect due to the error rate). Although the output was lower than in Comparative Example 1, the absolute value was large when employing an MR head (conventional inductance head+20 dB), so there was no problem at about −10 dB. This is thus reference data.

Embodiment 1: A standard embodiment. The C/N ratio improved by 7 dB.

Embodiment 2: A magnetic material the plate diameter and the plate ratio of which were smaller than in Embodiment 1; Hc was 255 KA/m (3,200 Oe). The magnetic layer was also thin. Since the magnetization level was decreased by the thinner magnetic layer, output decreased. However, the magnetic grains were small and the lower layer acicular powder contributed so that there was little variation in thickness, resulting in an adequate C/N ratio.

Embodiment 3: The plate diameter and plate ratio were high relative to Embodiment 1. The Hc of the magnetic material was 171 KA/m (2150 Oe), and the magnetic layer was thick. Since the magnetization level was high, output increased. However, the large grain size and large variation in thickness resulted in a C/N that was adequately high but lower than that of Embodiment 1.

Embodiment 4: Magnetic grains with a grain size larger than in Embodiment 1, and a lower layer powder with a main axis length and acicular ratio higher than in Embodiment 1 were employed. Since the grain size and thickness variation were greater than in Embodiment 1, the C/N was somewhat lower.

Embodiment 5: The main axis length and acicular ratio of the lower layer powder were small. The boundary variation (σ) was greater than in Embodiment 1, causing a drop in C/N.

Embodiment 6: $TiO_2$ grains with a mean grain diameter of 35 nm were employed as the granular powder in the lower layer.

Embodiments 7–9: Vertical orientation was conducted with the coating solutions of Embodiments 1–3. The vertical magnetization component contributed to output, further raising the C/N ratio.

Embodiment 10: The quantity of carbon added to the lower layer was smaller than in Embodiment 7. Forming by calender was of low efficiency, resulting in a rather low C/N.

Embodiment 11: The quantity of carbon added to the lower layer was high. Dispersion in the lower layer was poor, surface roughness and boundary variation were high, and the C/N was rather low.

Comparative Example 2: Did not satisfy any of the conditions of claim 1.

According to the present invention, it is possible to provide a particulate magnetic recording medium exhibiting a high C/N in high-density recording (particularly in reproduction with MR heads).

What is claimed is:

1. A magnetic recording medium comprising on a flexible nonmagnetic support, in order, a lower layer comprising a nonmagnetic powder and a binder, and a magnetic layer comprising a ferromagnetic powder and a binder, wherein an average thickness of said magnetic layer ranges from 0.02 μm to 0.2 μm; said ferromagnetic powder contained in said magnetic layer is a magnetic powder of platelike hexagonal ferrite with a mean plate diameter equal to or less than 40 nm; said nonmagnetic powder contained in said lower layer is an inorganic acicular powder with a mean major axis length equal to or less than 0.2 μm; and a plate ratio of said ferromagnetic powder is equal to or less than an acicular ratio of said inorganic powder of the lower layer.

2. The magnetic recording medium according to claim 1, wherein a mean grain volume of said ferromagnetic powder ranges from 1,500 to 15,000 $nm^3$, and a coercivity of said magnetic layer in the longitudinal direction is equal to or more than 167 KA/m.

3. The magnetic recording medium according to claim 1, wherein a squareness of the magnetic layer in the vertical direction (SQ⊥) is equal to or more than 0.3 and a coercivity in the vertical direction (Hc⊥) is equal to or more than 119 KA/m.

4. The magnetic recording medium according to claim 1, wherein 10–30 parts of granular particles with a mean primary particle diameter of not more than 50 nm and a true specific gravity of not more than 5 are incorporated into said lower layer per 100 parts of acicular powder.

5. The magnetic recording medium according to claim 1, wherein said platelike hexagonal ferrite has a grain diameter within a range of from 0.01 to 0.2 μm.

6. The magnetic recording medium according to claim 1, wherein said platelike hexagonal ferrite has a grain diameter in a range of from 0.02 to 0.1 μm.

7. The magnetic recording medium according to claim 1, wherein said platelike hexagonal ferrite has a mean plate thickness in a range of from 0.001 to 0.2 μm.

8. The magnetic recording medium according to claim 1, wherein said platelike hexagonal ferrite has a mean plate thickness in a range of from 0.003 to 0.05 μm.

9. The magnetic recording medium according to claim 1, wherein said platelike hexagonal ferrite has a plate ratio (grain diameter/plate thickness) in a range of from 1 to 15.

10. The magnetic recording medium according to claim 1, wherein said platelike hexagonal ferrite has a plate ratio (grain diameter/plate thickness) in a range of from 3 to 7.

11. The magnetic recording medium according to claim 1, wherein said platelike hexagonal ferrite has a specific surface area (SBET) in a range of from 25 to 100 $m^2$/g.

12. The magnetic recording medium according to claim 1, wherein said platelike hexagonal ferrite has a specific surface area (SBET) in a range of from 40 to 70 $m^2$/g.

13. The magnetic recording medium according to claim 1, wherein said platelike hexagonal ferrite has a saturation magnetization equal to or greater than 50 $Am^2$/kg.

14. The magnetic recording medium according to claim 1, wherein said platelike hexagonal ferrite has a saturation magnetization equal to or greater than 60 $Am^2$/kg.

* * * * *